US012657621B2

(12) United States Patent
Wu et al.

(10) Patent No.: US 12,657,621 B2
(45) Date of Patent: Jun. 16, 2026

(54) PIVOT GROUP GENERATION FOR SEARCH AND RECOMMENDATION SYSTEMS

(71) Applicant: eBay Inc., San Jose, CA (US)

(72) Inventors: Gaomin Wu, Jersey City, NJ (US); Daniel Ryan Schonfeld, Long Island, NY (US); Xingming Qu, Frisco, TX (US); Jonathan Frank Galsurkar, New York, NY (US); Chen Xue, Alexandria, VA (US)

(73) Assignee: eBay Inc., San Jose, CA (US)

( * ) Notice: Subject to any disclaimer, the term of this patent is extended or adjusted under 35 U.S.C. 154(b) by 180 days.

(21) Appl. No.: 18/399,452

(22) Filed: Dec. 28, 2023

(65) Prior Publication Data

US 2025/0124483 A1     Apr. 17, 2025

Related U.S. Application Data

(60) Provisional application No. 63/543,655, filed on Oct. 11, 2023.

(51) Int. Cl.
*G06Q 30/00* (2023.01)
*G06Q 30/0601* (2023.01)

(52) U.S. Cl.
CPC ..... *G06Q 30/0631* (2013.01); *G06Q 30/0623* (2013.01)

(58) Field of Classification Search
CPC ...................... G06Q 30/0631; G06Q 30/0623
See application file for complete search history.

(56) References Cited

U.S. PATENT DOCUMENTS 11,496,353 B2   11/2022   Chandrasekhar et al.
2017/0017638 A1   1/2017   Satyavarta et al.
(Continued)

FOREIGN PATENT DOCUMENTS

CN   116433328 A   7/2023
CN   116595150 A   8/2023
(Continued)

OTHER PUBLICATIONS

S. Anjum, M. R. Ali Masood, Y. Gupta and S. Sukhija, "Leveraging Network Similarity Measures for Recommendation Systems," 2022 International Conference on Emerging Techniques in Computational Intelligence (ICETCI), Hyderabad, India, 2022, pp. 102-109, doi: 10.1109/ICETCI55171.2022.9921383. (Year: 2022).*
(Continued)

*Primary Examiner* — Anand Loharikar
(74) *Attorney, Agent, or Firm* — Shook Hardy & Bacon L.L.P.

(57)     ABSTRACT

Some aspects relate to technologies for generating pivots using a generative model and grouping items into pivot groups using the pivots. Pivots are generated by obtaining item information for items, generating a prompt using the item information, and causing a generative model to use the prompt to generate text for the pivots, including a pivot name and pivot description for each pivot. A pivot embedding is also generated for each pivot. When items are to be returned to a user device (e.g., as recommended items or search result items), item embeddings for the items and the pivot embeddings for the pivots are used to assign each item to a particular pivot to generate pivot groups that each includes a pivot name, a pivot description, and assigned items. User interface information is provided to present at least a portion of the pivot groups on a user device.

9 Claims, 13 Drawing Sheets

(56)                    References Cited

U.S. PATENT DOCUMENTS

| | | | |
|---|---|---|---|
| 2021/0287271 A1 | 9/2021 | Prasad et al. | |
| 2022/0230226 A1 | 7/2022 | Shahrasbi et al. | |
| 2022/0335489 A1 | 10/2022 | Rao Karikurve et al. | |
| 2024/0403373 A1* | 12/2024 | Chao ................... | G06F 16/9538 |

FOREIGN PATENT DOCUMENTS

| | | |
|---|---|---|
| CN | 116596618 A | 8/2023 |
| CN | 116843407 A | 10/2023 |
| JP | 2023-043129 A | 3/2023 |
| JP | 2023-108590 A | 8/2023 |
| JP | 2023-129333 A | 9/2023 |
| KR | 10-2023-0129875 A | 9/2023 |

OTHER PUBLICATIONS

Extended European Search Report received for European Application No. 24202181.4 , mailed on Feb. 17, 2025, 12 pages.

Chen et al., "Knowledge Graph Completion Models are Few-shot Learners: An Empirical Study of Relation Labeling in E-commerce with LLMs", Available online at: <https://arxiv.org/pdf/2305.09858.pdf>, May 17, 2023, 11 pages.

Fan et al., "Recommender Systems in the Era of Large Language Models (LLMs)", Available online at: <https://arxiv.org/pdf/2307.02046v2.pdf>, Aug. 5, 2023, 19 pages.

Maragheh et al., "LLM-Based Aspect Augmentations for Recommendation Systems", ICML 2023 Workshop on Challenges in Deployable Generative AI, Jul. 10, 2023, 6 pages.

Pan et al., "Evolving Recommendations: A Personalized User-Based Ranking Model", Available online at: <https://innovation.ebayinc.com/tech/engineering/evolving-recommendations-a-personalized-user-based-ranking-model/>, Oct. 3, 2023, 9 pages.

Shahane et al., "eBay's Blazingly Fast Billion-Scale Vector Similarity Engine", Available online at: <https://innovation.ebayinc.com/tech/engineering/ebays-blazingly-fast-billion-scale-vector-similarity-engine/>, May 1, 2023, 16 pages.

Wang et al., "Personalized Embedding-based e-Commerce Recommendations at eBay", Available online at: <https://arxiv.org/pdf/2102.06156v1.pdf>, Feb. 11, 2021, 9 pages.

Xue et al., "How eBay Created a Language Model with Three Billion Item Titles", Available online at: <https://tech.ebayinc.com/engineering/how-ebay-created-a-language-model-with-three-billion-item-titles/>, Jan. 9, 2023, 12 pages.

Xue, C., "Improving Shopping Recommendations for Customers Through eBay's Relevance Cascade Model", Available online at: <https://innovation.ebayinc.com/tech/engineering/improving-shopping-recommendations-for-customers-through-ebays-relevance-cascade-model/>, Apr. 5, 2022, 7 pages.

Yang et al., "PALR: Personalization Aware LLMs for Recommendation", Available online at: <https://arxiv.org/pdf/2305.07622v3.pdf>, Jun. 7, 2023, 5 pages.

* cited by examiner

Figure 3:
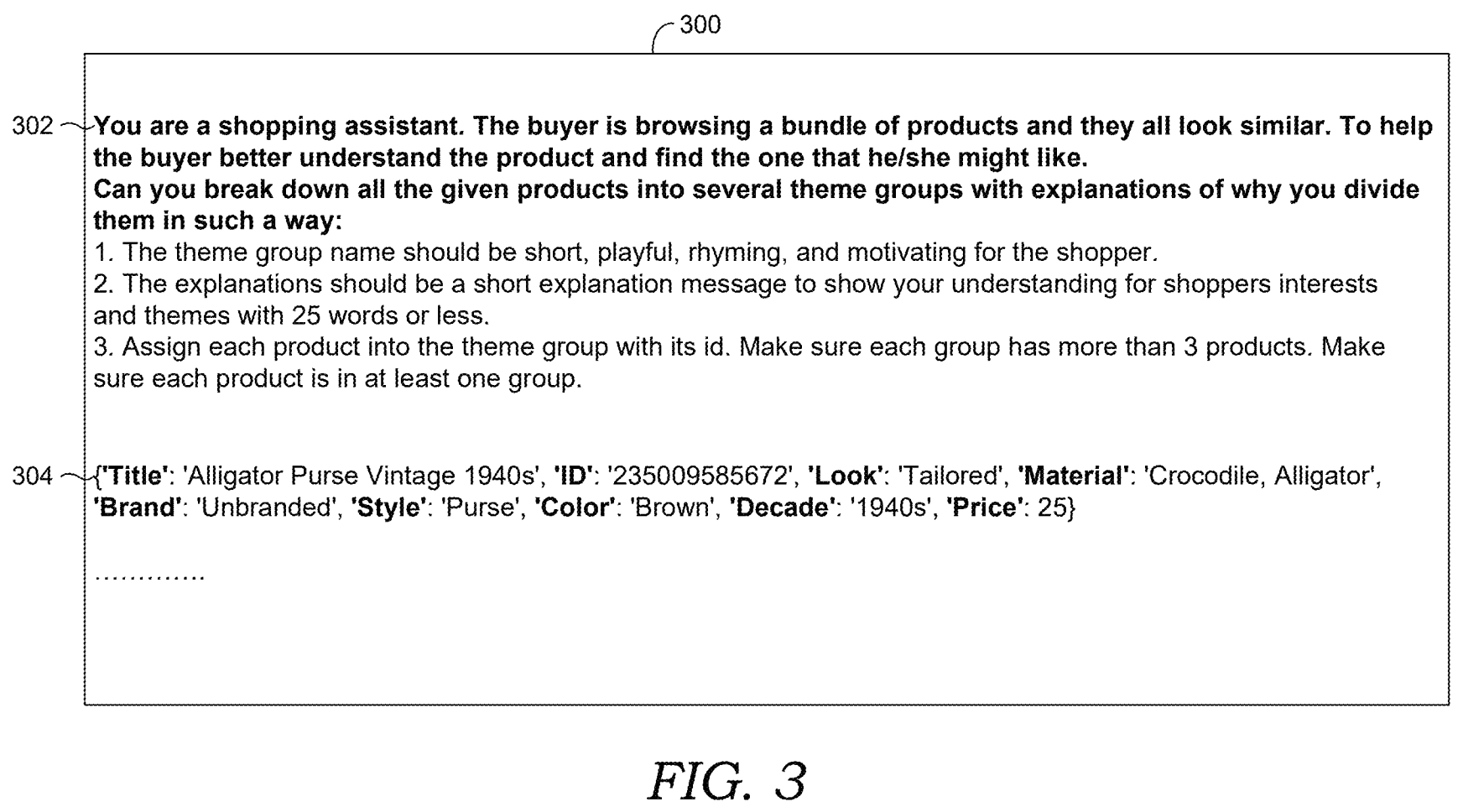

300

302 — You are a shopping assistant. The buyer is browsing a bundle of products and they all look similar. To help the buyer better understand the product and find the one that he/she might like.
Can you break down all the given products into several theme groups with explanations of why you divide them in such a way:
1. The theme group name should be short, playful, rhyming, and motivating for the shopper.
2. The explanations should be a short explanation message to show your understanding for shoppers interests and themes with 25 words or less.
3. Assign each product into the theme group with its id. Make sure each group has more than 3 products. Make sure each product is in at least one group.

304 — {'Title': 'Alligator Purse Vintage 1940s', 'ID': '235009585672', 'Look': 'Tailored', 'Material': 'Crocodile, Alligator', 'Brand': 'Unbranded', 'Style': 'Purse', 'Color': 'Brown', 'Decade': '1940s', 'Price': 25}

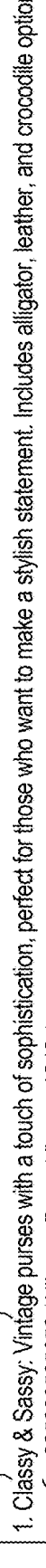

1. Classy & Sassy: Vintage purses with a touch of sophistication, perfect for those who want to make a stylish statement. Includes alligator, leather, and crocodile options.
- 23500958567 2 (Alligator Purse Vintage 1940s)
- 12595588586 8 (Vintage Purse 194's Leather Brown Alligator Arm Da)
- 28527544673 1 (Vintage 1940s Alligator Skin Handbag)
- 15555854363 2 (Vintage Womens Deitsch Brown Genuine Crocodile Purse Handbag Coin Comb Mirror)
- 27583850127 2 (Vintage ALLIGATOR GENUINE CROCODILE BABY CAMEN Handbag Purse 1950s Era Leather)

2. Mod & GoGo: Vibrant and stylish purses with a touch of the 1960s Mod and GoGo fashion trends.
- 22560094076 2 (Vintage Leather Bags by Francois of California Handbag / Purse BlackMod 1960's)
- 33487064768 9 (Vintage Meyers for Woolf Brothers Blue Patent Faux Leather Mini Box Purse - 1960)
- 37473508217 1 (vintage patent leather purse Twist Lock Brown 1960's 70's Handbag)
- 26270502044 (Vintage Leather Lizard Handbag 1950-1960s Brass Hardware "Read Description")
- 33486522455 7 (Vintage Genuine Alligator Crocodile Clutch Hand Shoulder Bag Purse leather Vtg)

3. Evening Delight: Elegant and refined purses suitable for eveningwear or special occasions.
- 20435644826 5 (John Romain Vintage Leather Handbag Purse Satchel Shoulder Horse Bit Oxblood)
- 36426416535 7 (Vintage Madwed 1950's Brown Natural Lizard Alligator Leather Clamshell Purse Bag)
- 23496832007 4 (Murray Kruger Vintage 1950's Black Satin Evening Clutch Purse)
- 38565150256 1 (Vintage RODO ITALY Purse Black Satin Silk Clutch Rhinestone Clasp W/ Hand Strap)

4. Retro Charm: Vintage purses with timeless charm and an Art Deco influence.
- 40430914931 2 (Beautiful Quality Vintage 'Riviera'? Crocodile / Alligator Handbag, Suede Lined)
- 22559443900 8 (Vintage Genuine Alligator Crocodile Caiman Purse made in Florida USA)
- 18591194167 1 (Vintage 1950s Butterscotch Lucite Handbag)
- 33472306888 4 (Unique, Vintage Armadillo Purse w/ Fur Top & Handle Authentic NEVER USED 1940's)

5. Funky & Chunky: Unique and eye-catching purses featuring unconventional materials and designs.
- 25609814618 8 (Vintage Handbag With Acrylic Handles-Red Matte Sequins)
- 39444851783 8 (Vintage Black Handbag Clutch)
- 33480420106 1 (Vintage Beaded Embellished Hand Purse)
- 15558640034 8 (Shaggee Hollywood Vintage Wood Framed Woven Vinyl Seafoam Green Satchel Bag)

*FIG. 4*

MEMORY
1112

PROCESSOR(S)
1114

PRESENTATION
COMPONENT(S)
1116

I/O PORT(S)
1118

I/O COMPONENTS
1120

POWER SUPPLY
1122

1110

1100

PIVOT GROUP GENERATION FOR SEARCH AND RECOMMENDATION SYSTEMS

CROSS-REFERENCE TO RELATED APPLICATIONS

This application claims the benefit of U.S. Provisional Application No. 63/543,655, filed Oct. 11, 2023, which is herein incorporated by reference in its entirety.

BACKGROUND

The amount of information and content available on the Internet and/or stored on devices continues to grow exponentially. Given the vast amount of information, search and recommendation technologies have become integral to locating relevant information. For instance, search engines facilitate quickly finding items in electronic databases, such as, for instance, databases of items available on e-commerce systems. Search engines receive search queries and provide search results for items that are responsive to the search queries. For a given search query, a search engine can process the search query, user data, contextual data, and/or other inputs to identify the most relevant items for the particular search. Search results for identified items can be presented on a user device in several different forms, for instance, on a search results user interface. Recommendation systems are related technology in which items are recommended to a user. A variety of recommendation algorithms have been developed to select recommended items based on, for instance, seed items, user behavior information, and user preferences. Such recommendation systems have become ubiquitous and crucial for content discovery on various platforms like online retail, music, image search, and video streaming.

SUMMARY

Some aspects of the present technology relate to, among other things, using generative models to generate pivot groups that organize search result items or recommended items around themes to facilitate item discovery. In accordance with some aspects, item information from sampled items is used to generate a prompt that can also include information instructing a generative model regarding the generation of pivots based on the item information. The prompt is provided as input to the generative model, which generates pivots based on the item information. Each pivot is associated with a theme discovered by the generative model from the item information and includes a pivot name and pivot description for the theme. A pivot embedding is also generated for each pivot. In some aspects, the pivot embedding for a pivot is generated as a function of item embeddings for items associated with the pivot by the generative model. When search result items or recommended items are selected for presentation on a user device, pivot groups are generated to organize the items. Items are assigned to pivots using item embeddings for the items and the pivot embeddings (e.g., based on a similarity measure, such as cosine similarity) to form the pivot groups. Each pivot group includes a pivot name, a pivot description, and one or more items. The pivot groups are then provided for presentation on a user device, for instance, on a search results page, item page, or other user interface.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present technology is described in detail below with reference to the attached drawing figures, wherein:

FIG. 3 is a diagram providing an example of a prompt for input to a generative model to generate pivots in accordance with some implementations of the present disclosure;

FIG. 4 is a diagram providing an example of an output with pivots generated by a generative model in accordance with some implementations of the present disclosure;

DETAILED DESCRIPTION

Overview

Figure 1:
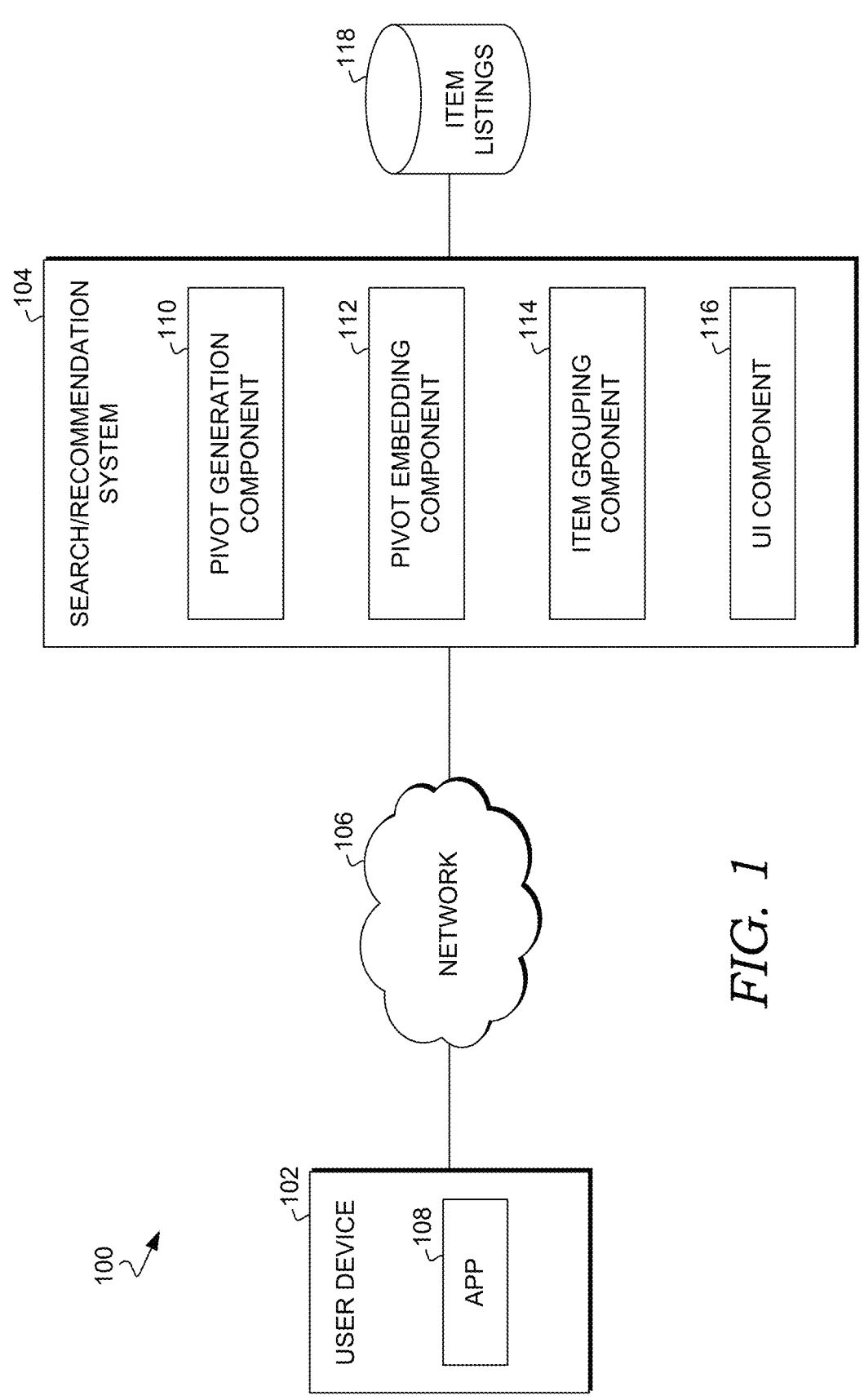
FIG. 1 is a block diagram illustrating an exemplary system in accordance with some implementations of the present disclosure.

While search/recommendation systems are useful tools for locating items, shortcomings in existing search and recommendation technologies often result in the consumption of an unnecessary quantity of computing resources (e.g., I/O costs, network packet generation costs, throughput, memory consumption, etc.). For instance, current search systems often fall short in allowing users to efficiently find items of interest. This could be a result of limited query understanding by the search engine. Search systems typically operate on keyword-based queries and may not fully understand some queries, such as complicated natural language queries submitted by some users. While some search systems provide filtering functions to filter search results, the available filters can be insufficient or not intuitive. In the context of recommendations, the recommend items provided by the recommendation system are often too similar or too diverse to seed items, and there is no way to adjust the distance of the recommended items to the seed items. While some recommendation systems personalize recommended items for users, such personalization is not available in many situations, such as when a user navigates to an item page from a third-party search engine.

As a result of shortcomings in existing search and recommendation technologies, users often have to submit multiple queries before finding desired items. For example, a user may issue a first query to a search engine that returns a set of search results for a given item. The user may browse the search results and select certain search results to access the corresponding items. Selection of items causes retrieval of the items from various content sources. Additionally, in some cases, applications supporting those items are launched in order to render the items. In the context of recommendation, when recommended items are insufficient, users may select certain items to view the item pages and discover the items are not what the user is seeking. This often results in the users turning to query-based searching, which can involve issuing numerous queries in an attempt to identify relevant items as discussed above.

These repetitive inputs result in increased computing resource consumption, among other things. For instance, repetitive user queries result in packet generation costs that adversely affect computer network communications. Each time a user issues a query, the contents or payload of the query is typically supplemented with header information or other metadata within a packet in TCP/IP and other protocol networks. Accordingly, when this functionality is multiplied by all the inputs needed to obtain the desired data, there are throughput and latency costs by repetitively generating this metadata and sending it over a computer network. In some instances, these repetitive inputs (e.g., repetitive clicks, selections, or queries) increase storage device I/O (e.g., excess physical read/write head movements on non-volatile disk) because each time a user inputs unnecessary information, such as inputting several queries, the computing system often has to reach out to the storage device to perform a read or write operation, which is time consuming, error prone, and can eventually wear on components, such as a read/write head. Further, if users repetitively issue queries, it is expensive because processing queries consumes a lot of computing resources. For example, for some search engines, a query execution plan may need to be calculated each time a query is issued, which requires a search system to find the least expensive query execution plan to fully execute the query. This decreases throughput and increases network latency, and can waste valuable time.

Aspects of the technology described herein improve the functioning of the computer itself in light of these shortcomings in existing search and recommendation technologies by providing a solution that enables a search/recommendation system to leverage generative models to generate pivot groups that group similar items around different themes. Generally, a generative model is used to generate pivots, which present different themes for grouping items. Additionally, pivot embeddings are generated for the pivots. When items are selected for presentation on a user device (e.g., as search result items or recommended items), item embeddings for the items and the pivot embeddings are used to assign items to pivots to form pivot groups, which are provided for presentation on the user device. The pivot groups facilitate the search/recommendation process in more efficiently providing items of interest.

More particularly, in accordance with some aspects of the technology described herein, a generative model is used to generate pivots from item information for a collection of items. Each pivot corresponds with a theme discovered by the generative model from the item information and comprises a pivot name and pivot description generated by the generative model. The pivot name can be an identifier of the theme, while the pivot description can be a short explanation of the theme. To generate the pivots, item information for a collection of items is used to create a prompt that can also include information instructing the generative model how to generate the pivots, including how to generate pivot names and pivot descriptions for the pivots. The prompt is provided as input to the generative model, which generates text for pivot names and pivot descriptions as output. In some aspects, the items are from a given item category to cause the generative model to generate pivots relevant to the item category. For example, the collection of items can be sampled from items corresponding to a shoe category, such that the generative model generates pivots relevant to items in the shoe category.

A pivot embedding is generated for each of the pivots. In some aspects, the pivot embeddings are generated as a function of item embeddings for items associated with each pivot by the generative model. This could include items from the collection of items used to generate the pivots and/or other sampled items.

When search result items or recommended items are selected for presentation on a user device (e.g., in response to a search query or when an item page is presented with similar items), the search/recommendation system uses the pivots and pivot embeddings to generate pivot groups to organize the items being provided to the user device. In some aspects, item embeddings for the items to be returned to the user device are obtained. Based on the item embeddings and the pivot embeddings (e.g., using a similarity measure, such as cosine similarity), items are assigned to pivots to generate pivot groups. Each pivot group includes a pivot name, pivot description, and one or more items. In some aspects, the items and pivot groups can be ranked, such that the pivot groups are ordered based on the pivot group rankings and items are ordered within each pivot group based on the item rankings.

Aspects of the technology described herein provide a number of improvements over existing search/recommendation technologies. For instance, computing resource consumption is improved relative to existing technologies. In particular, providing pivot groups that group items around certain themes allows the system to more efficiently provide relevant items as search results or recommended items. Users can review the pivot names and pivot descriptions to identify themes relevant to them and explore the items associated with the relevant themes. This eliminates (or at least reduces) the repetitive user queries, search result selections, and rendering of items because users can more readily identify relevant items without the need to continuously input various search queries to access search results and/or continuously make item selections to obtain further information around presented items. Accordingly, aspects of the technology described herein decrease computing resource consumption, such as packet generation costs. For instance, a user query (e.g., an HTTP request), would only need to traverse a computer network once (or fewer times relative to existing technologies). Specifically, the contents or payload of the user query is supplemented with header information or other metadata within a packet in TCP/IP and other protocol networks once for the initial user query. Such packet for a user query is only sent over the network once or fewer times. Thus, there is no repetitive generation of metadata and continuous sending of packets over a computer network.

In like manner, aspects of the technology described herein improve storage device or disk I/O and query execution functionality, as they only need to go out to disk a single time (or fewer times relative to existing search technologies). As described above, the inadequacy of existing search and recommendation technologies results in repetitive user queries, search result selections, and item renderings. This causes multiple traversals to disk. In contrast, aspects described herein reduce storage device I/O because the user provides only minimal inputs and so the computing system does not have to reach out to the storage device as often to perform a read or write operation. For example, the system can respond with search result items or recommended items that organize the items in way that satisfies user intent from a single user query (or few queries relative to existing technology) and/or single round of providing recommendations. Accordingly, there is not as much wear on components, such as a read/write head, because disk I/O is substantially reduced.

Various configurations also improve query execution resource savings. Specifically, for example, the search system calculates a query execution plan on fewer queries relative to existing search technologies. This increases throughput and decreases network latency because aspects of the technology described herein do not have to repetitively calculate query execution plans because fewer user queries need to be executed, unlike existing search technologies.

Example System for Generating Pivot Groups

With reference now to the drawings, FIG. 1 is a block diagram illustrating an exemplary system 100 for generating and providing pivot groups to organize items presented to users in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 is an example of a suitable architecture for implementing certain aspects of the present disclosure. Among other components not shown, the system 100 includes a user device 102 and a search/recommendation system 104. Each of the user device 102 and search/recommendation system 104 shown in FIG. 1 can comprise one or more computer devices, such as the computing device 1100 of FIG. 11, discussed below. As shown in FIG. 1, the user device 102 and the search/recommendation system 104 can communicate via a network 106, which may include, without limitation, one or more local area networks (LANs) and/or wide area networks (WANs). Such networking environments are commonplace in offices, enterprise-wide computer networks, intranets, and the Internet. It should be understood that any number of user devices and servers may be employed within the system 100 within the scope of the present technology. Each may comprise a single device or multiple devices cooperating in a distributed environment. For instance, the search/recommendation system 104 could be provided by multiple server devices collectively providing the functionality of the search/recommendation system 104 as described herein. Additionally, other components not shown may also be included within the network environment.

The user device 102 can be a client device on the client-side of operating environment 100, while the search/recommendation system 104 can be on the server-side of operating environment 100. The search/recommendation system 104 can comprise server-side software designed to work in conjunction with client-side software on the user device 102 so as to implement any combination of the features and functionalities discussed in the present disclosure. For instance, the user device 102 can include an application 108 for interacting with the search/recommendation system 104. The application 108 can be, for instance, a web browser or a dedicated application for providing functions, such as those described herein. This division of operating environment 100 is provided to illustrate one example of a suitable environment, and there is no requirement for each implementation that any combination of the user device 102 and the search/recommendation system 104 remain as separate entities. While the operating environment 100 illustrates a configuration in a networked environment with a separate user device and search/recommendation system, it should be understood that other configurations can be employed in which components are combined. For instance, in some configurations, a user device may also provide search/recommendation capabilities.

The user device 102 may comprise any type of computing device capable of use by a user. For example, in one aspect, the user device may be the type of computing device 1100 described in relation to FIG. 11 herein. By way of example and not limitation, the user device 102 may be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device where notifications can be presented. A user may be associated with the user device 102 and may interact with the search/recommendation system 104 via the user device 102.

In accordance with some aspects, the search/recommendation system 104 may be part of a listing platform. Examples of listing platforms include e-commerce platforms, in which listed products or services are available for purchase by a user of a client device upon navigation to the platforms. Other examples of listing platforms include rental platforms listing various items for rent (e.g., equipment, tools, real estate, vehicles, contract employees) and media platforms listing digital content items (e.g., digital content for streaming/download).

The functionality of a listing platform includes provision of interfaces enabling surfacing of item listings for items to users of the listing platform. Item listings for items available for sale/rent/consumption via the listing platform are stored by the item listings data store 118. Each item listing may include a description relating to the item comprising one or more of a price in a currency, reviews, images of the item, shipment options, a rating, a condition of the item, a size of the item, a color of the item, etc. In aspects, the item is associated with one or more categories including meta-categories and leaf categories. For example, the meta-categories are each divisible into subcategories (or branch categories), whereas leaf categories are not divisible.

At a high level, the search/recommendation system 104 employs a generative model to generate pivots, including pivot names and pivot descriptions. When providing items to a user device, such as the user device 102, the search/ recommendation system 104 groups items using the pivots into a number of pivot groups. This can be, for instance, in the context of returning search results in response to a search query, providing recommendations (e.g., on a homepage, product page, or other location of an e-commerce website), or otherwise providing information for a number of items to a user device.

As shown in FIG. 1, the search/recommendation system 104 includes a pivot generation component 110, a pivot embedding component 112, an item grouping component 114, a user interface component 116, and the item listings data store 118. The components of the search/recommendation system 104 may be in addition to other components that provide further additional functions beyond the features described herein. The search/recommendation system 104 can be implemented using one or more server devices, one or more platforms with corresponding application programming interfaces, cloud infrastructure, and the like. While the search/recommendation system 104 is shown separate from the user device 102 in the configuration of FIG. 1, it should be understood that in other configurations, some or all of the functions of the search/recommendation system 104 can be provided on the user device 102.

In one aspect, the functions performed by components of the search/recommendation system 104 are associated with one or more personal assistant applications, services, or routines. In particular, such applications, services, or routines may operate on one or more user devices, servers, may be distributed across one or more user devices and servers, or be implemented in the cloud. Moreover, in some aspects, these components of the search/recommendation system 104 may be distributed across a network, including one or more servers and client devices, in the cloud, and/or may reside on a user device. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 100, it is contemplated that in some aspects, functionality of these components can be shared or distributed across other components.

The pivot generation component 110 of the search/recommendation system 104 generates pivots using a generative model. Generally, the pivot generation component 110 accesses information for a number of items, for instance, from the item listing data store 118 (although the item information could be obtained from other sources). The item information is provided as input to a generative model, which generates a number of pivots based on the item information. Each pivot includes a pivot name and a pivot description that comprise text generated by the generated model. In some aspects, the item information forms part of a prompt that is provided as input to the generative model. The prompt could be generated to include one or more rules that instruct the generative model on how to generate the pivot names and pivot descriptions. In some aspects, the pivot generation component 110 generates pivots offline and stores information regarding the pivots for use in generating pivot groups online when returning items to a user device, such as the user device 102.

Figure 2A:
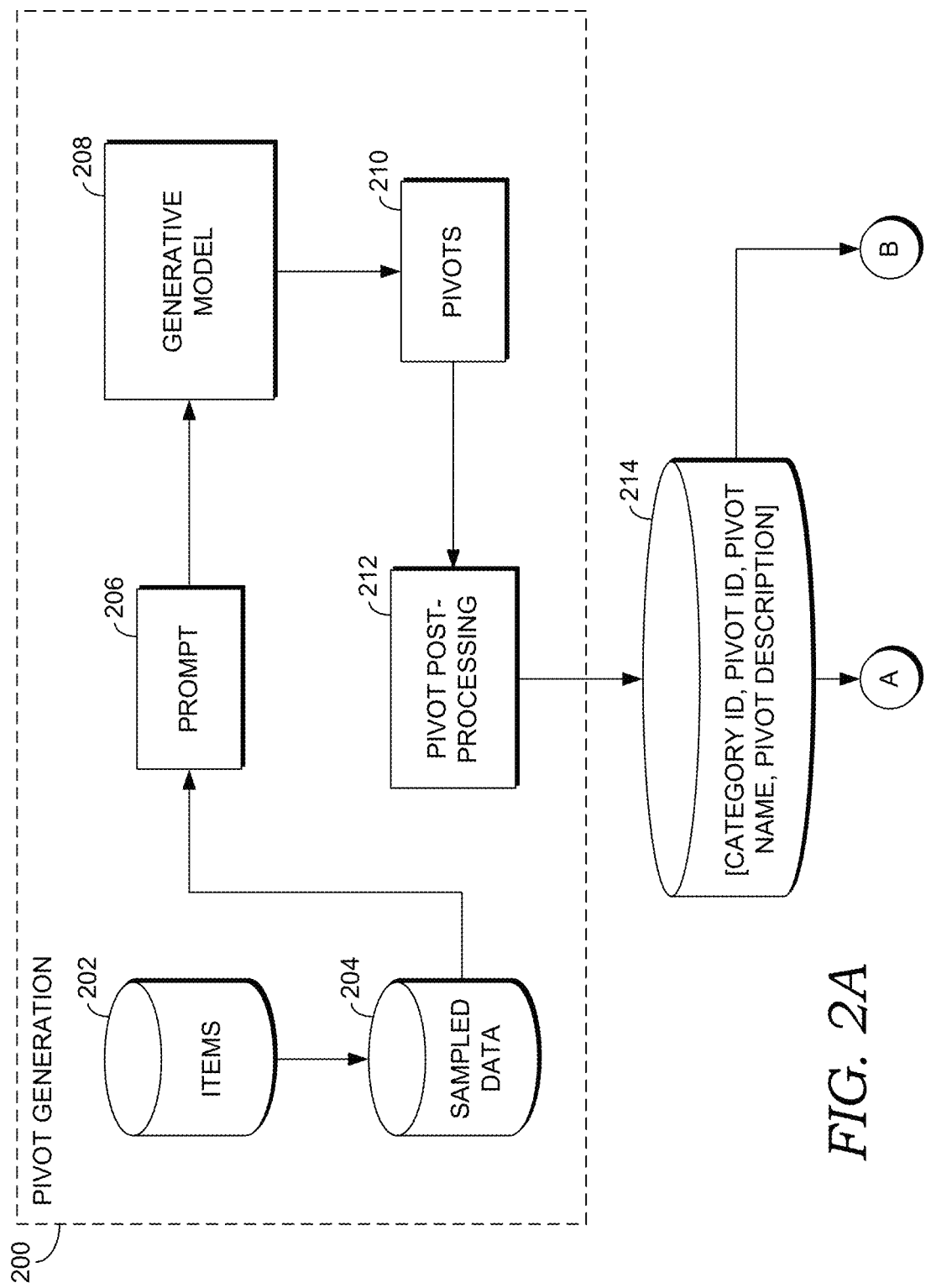
FIG. 2A is a block diagram showing an example process for generating pivots in accordance with some implementations of the present disclosure.

FIG. 2A provides a block diagram illustrating an example process 200 for generating pivots using a generative model, which can be performed, for instance, by the pivot generation component 110 of FIG. 1. As shown in FIG. 2A, data is sampled from an item data store 202, and the sampled data 204 is used to generate a prompt 206 for input to a generative model 208. In some aspects, the item data store 202 corresponds to the item listing data store 118 of FIG. 1. For instance, the item data store 202 could store item information regarding items available on a listing platform, such as that used by an e-commerce website. However, it should be understood that in other aspects, the item data store 202 could be another source of item information. For instance, the item data store 202 could be a collection of information regarding items provided solely for the purpose of generating pivots.

In some aspects of the technology described herein, the sampled data 204 includes item information for items from a given item category. For instance, to generate pivots for a shoe category, information for items categorized as shoes in the item data store 202 would be accessed. In other aspects, the sampled data 204 is independent of any item category. The item information for a given item in the sampled data 204 can include, for instance, a title, item ID, a price, item attributes, and/or an item description. The item information can comprise structured text (e.g., name/value pairs) and/or unstructured text.

The prompt 206 comprises text that includes item information from the sampled data 204. The prompt 206 can also include information to instruct the generative model 208 to generate pivots based on the item information. In some aspects, the prompt 206 includes one or more rules regarding the generation of the pivots, such as how the pivot names and pivot descriptions should be constructed. For instance, a rule could instruct the generative model 208 to generate pivot names that are short and rhyming. As another example, a rule could instruct the generative model 208 to generate pivot descriptions that describe the theme for the pivot within a certain number of words (e.g., 25 words or less). In accordance with some aspects, the prompt 206 is generated using prompt engineering. Prompt engineering is a process that involves designing and crafting effective prompts to obtain desired responses from a generative model that are accurate, relevant, and useful. The process could involve iteratively creating experimental prompts, providing the experimental prompts as input to a generative model, and revising the experimental prompts based on output from the generative model.

By way of illustration, FIG. 3 provides an example of a prompt 300 that could be provided as input to a generative model in accordance with some aspects. As shown in FIG. 3, the prompt 300 includes information 302 with particular rules to instruct the generative model on how to generate the pivots. In this example, the information 302 includes rules regarding how to generate the pivot names and descriptions. The information 302 also includes a rule to group items with the generated pivots and how to perform the grouping. The prompt 300 further includes item information 304. While the item information 304 in the prompt 300 includes information for only a single item for clarity purposes, it should be understood that a prompt can generally include information for any number of items. Additionally, while the prompt 300 provides an example in which the item information 304 includes structured text (i.e., name/value pairs), the item information can comprise unstructured text (e.g., a general textual description of an item).

With reference again to FIG. 2A, the generative model 208 can comprise a language model that includes a set of statistical or probabilistic functions that performs Natural Language Processing (NLP) in order to understand, learn, and/or generate human natural language content. For example, a language model can be a tool that determines the probability of a given sequence of words occurring in a sentence (e.g., via NSP or MLM) or natural language sequence. Simply put, it can be a model that is trained to predict the next word in a sentence. A language model is called an LLM when it is trained on enormous amount of data. Some examples of LLMs are GOOGLE's BERT and OpenAI's GPT-3 and GPT-4. These models have capabilities ranging from writing a simple essay to generating complex computer codes—all with limited to no supervision. Accordingly, an LLM can comprise a deep neural network that is very large (billions to hundreds of billions of parameters) and understands, processes, and produces human natural language by being trained on massive amounts of text. These models can predict future words in a sentence letting them generate sentences similar to how humans talk and write.

In accordance with some aspects, the generative model 208 comprises a neural network. As used herein, a neural network comprises at least three operational layers, although a neural network may include many more than three layers (i.e., a deep neural network). The three layers can include an input layer, a hidden layer, and an output layer. Each layer comprises neurons. Different types of layers and networks connect neurons in different ways. Neurons have weights, an activation function that defines the output of the neuron given an input (including the weights), and an output. The weights are the adjustable parameters that cause a network to produce a correct output.

In some configurations, the generative model 208 is a pre-trained model (e.g., GPT-4) that has not been fined-tuned. In other configurations, the generative model 208 is a model that is built and trained from scratch or a pre-trained model that has been fine-tuned. In such configurations, the generative model 208 can be trained or fine-tuned using training data. For instance, the training data can comprise pairs of item information and predefined pivot names and descriptions (e.g., manually generated pivot names and pivot descriptions), and the generative model 208 is trained to fit the training data. During training, weights associated with each neuron can be updated. Originally, the generative model 208 can comprise random weight values or pre-trained weight values that are adjusted during training. In one aspect, the generative model 208 is trained using backpropagation. The backpropagation process comprises a forward pass, a loss function, a backward pass, and a weight update. This process is repeated using the training data. For instance, each iteration could include providing item information as input to the model, generating an output by the model, comparing (e.g., computing a loss) the model output and the predefined pivot names and pivot descriptions paired with the input item information, and updating the model based on the comparison. The goal is to update the weights of each neuron (or other model component) to cause the generative model to produce useful pivot names and pivot descriptions. Once trained, the weight associated with a given neuron can remain fixed. The other data passing between neurons can change in response to a given input. Retraining the network with additional training data can update one or more weights in one or more neurons.

Based on the prompt 206 with the item information, the generative model 208 outputs a number of pivots 210. Each pivot output by the generative model 208 includes a pivot name and a pivot description around a different theme identified from the item information. In some aspects, the pivots 210 are generated in accordance with rules set forth by the prompt 206.

In some aspects, the output from the generative model 208 includes not only pivot names and pivot descriptions for a number of pivots but also associates, with each pivot, one or more items identified in the sampled data 204 and included as part of the prompt 206. In other words, the generative model 208 groups items from the sampled data 204 with the pivots 210. Each item can be associated with one or more of the pivots 210.

FIG. 4 provides an example of output 400 generated by a generative model. As shown in FIG. 4, the output 400 includes a number of pivots generated by the generative model. For each pivot, the generative model has generated a pivot name, such as the pivot name 402 for the first listed pivot, and a pivot description, such as the pivot description 404 for the first pivot. In the current example, the generative model has also grouped, with each pivot, items included as part of the prompt provided as input to the generative model. As such, the output 400 includes item information, such as the item information 406 for the first pivot, identifying items the generative model has associated with each pivot.

In some configurations, such as that shown in FIG. 2A, post-processing 212 is performed on the pivots 210 generated by the generative model 208. By way of example and not limitation, the post-processing 212 includes deduping the pivots 210. In particular, similar pivots can be identified, and the similar pivots can be combined and/or one or more of the pivots can be removed. In some configurations, the post processing 212 can include manual review of the generated pivots 210 by an administrator/developer to confirm that the generative pivots 210 are accurate and useful for grouping items. In some aspects, the pivot groups 210 can be refined using the generative model 208.

Following any post-processing 212, pivot information 214 is stored. The pivot information 214 for each pivot generated by the generative model 208 can include, for instance, a category ID (in instances in which the pivots were generated using items from a particular item category), a pivot ID, a pivot name, and a pivot description. Although not shown in FIG. 2A, in instances in which the generative model 208 also groups items from the sample data 204 with each pivot, the item information 214 for a pivot can further include a sequence of item information (e.g., item IDs) identifying the items associated with the pivot.

With reference again to FIG. 1, the search/recommendation system 104 also includes a pivot embedding component 112. Generally, the pivot embedding component 112 generates a pivot embedding for each pivot generated by the pivot generation component 110. In the context of natural language processing (NLP) and machine learning, an embedding refers to a numerical representation of text, images, audio, video, or other content in a way that captures their semantic meaning. In some aspects, the pivot embedding component 110 generates pivot embeddings offline and stores the pivot embeddings for use in generating pivot groups online when returning items to a user device, such as the user device 102.

In some configurations, the pivot embedding component 112 generates pivot embeddings based on the pivot names and descriptions. For instance, to generate a pivot embedding for a given pivot, the pivot embedding component 112 could provide the pivot name and pivot description to a machine learning model, which generates a pivot embedding from the pivot name and pivot description. In some configurations, to provide more robust pivot embeddings, the pivot embedding component 112 associates a number of items with each pivot and generates the pivot embeddings as a function of item embeddings for items associated with each pivot. The item embeddings could be text-based embeddings (i.e., embeddings generated by providing text from item information to a machine learning model) and/or multi-modal embeddings (i.e., embeddings generated by providing multiple types of inputs, such as text and images, from item information to a machine learning model). The items associated with each pivot for generating the pivot embeddings can include, for instance, items used to generate the pivots by the pivot generation component 110, other sampled items, and/or a combination thereof.

Figure 2B:
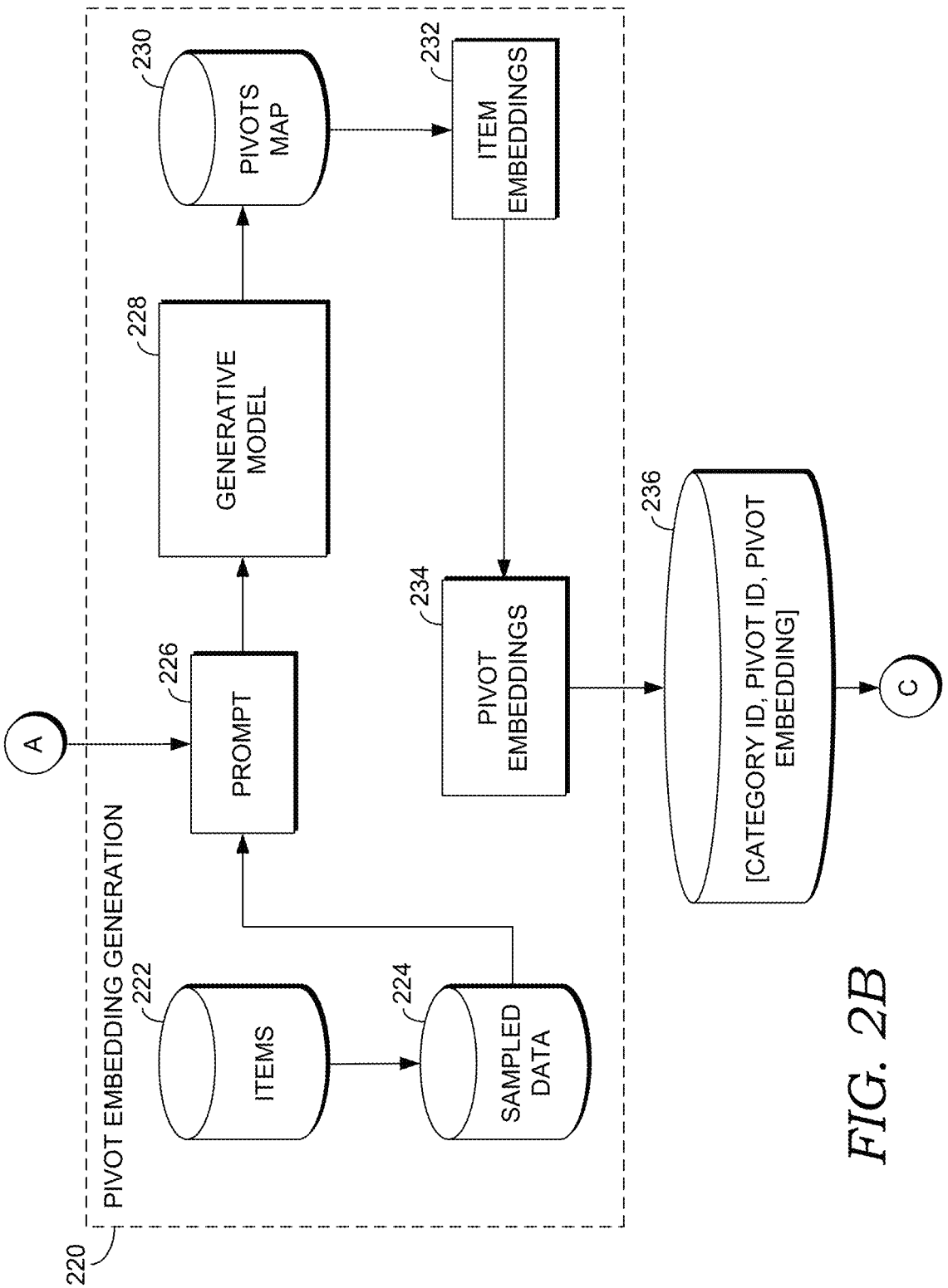
FIG. 2B is a block diagram illustrating an example process for generating pivot embeddings in accordance with some implementations of the present disclosure.

FIG. 2B provides a block diagram that illustrates an example process 220 for generating pivot embeddings, which can be performed, for instance, by the pivot embedding component 112 of FIG. 1. FIG. 2B illustrates an embodiment in which a generative model 228 is used to associate items with pivots generated, for instance, using the process 200 described above with reference to FIG. 2A. As shown in FIG. 2B, data is sampled from an item data store 222, and the sampled data 224 is used to generate a prompt 226 for input to the generative model 228. In some aspects, the item data store 222 corresponds to the item listing data store 118 of FIG. 1. For instance, the item data store 222 could store item information regarding items available on a listing platform, such as that used by an e-commerce website. However, it should be understood that in other aspects, the item data store 222 could be another source of item information. For instance, the item data store 222 could be a collection of information regarding items provided solely for the purpose of generating pivot embeddings.

In some aspects of the technology described herein in which the pivots are associated with an item category, the sampled data 224 includes item information for items from that item category. For instance, if the pivots correspond to a shoe category, information for items categorized as shoes in the item data store 222 would be accessed. In other aspects, the sampled data 224 is independent of any item category. The item information for a given item in the sampled data 224 can include, for instance, a title, item ID, a price, item attributes, and/or an item description. The item information can comprise structured text (e.g., name/value pairs) and/or unstructured text.

The prompt 226 comprises text that includes item information from the sampled data 224, pivots (including pivot names and pivot descriptions, e.g., generated using the process 200), and information to instruct the generative model 228 to associate the items identified by the item information with the pivots. In some aspects, the prompt 226 can instruct the generative model 228 to associate each item with only one pivot; while in other aspects, the prompt 226 can allow the generative model to associate each item with more than one pivot. In some configurations, the prompt 226 can further include the items used by the pivot generation process (e.g., the process 200). In instances in which the pivot generation process also associated those items with the generated pivots, those associations could also be identified by the prompt, which could further assist the generative model 228 in assigning items from the sampled data 224 to the pivots.

Given the prompt 226, the generative model 228 provides an output that assigns items from the sampled data 224 (and any items from the pivot generation process included in the prompt) to the pivots. As noted above, in some aspects, each item is assigned to only one pivot, while in other aspects each item can be assigned to one or more pivots. This provides a pivots map 230. The pivots map 230 can associate, with each pivot ID, a listing of item IDs for items assigned to each pivot by the generative model 228.

Item embeddings 232 for items mapped to the pivots are obtained and used to generate pivot embeddings 234 for the pivots. The item embeddings 232 can comprise, for instance, text-based embeddings generated from text associated with each item or multi-modal embeddings, such as embeddings generated from text and images associated with each item. In some aspects, the item embeddings 232 have previously been generated and stored, such that the item embeddings 232 can be retrieved from storage. In other aspects, the item embeddings 232 are generated as part of the pivot embedding generation process 220.

The pivot embedding for a given pivot is generated as a function of the item embeddings of items mapped to the pivot in the pivot map 230. By way of example and not limitation, the pivot embedding for a pivot could be generated as an average of the item embeddings for the items mapped to that pivot.

Following generation of the pivot embeddings, pivot embedding information 236 is stored. The pivot information 236 for each pivot can include, for instance, a category ID (in instances in which the pivots were generated using items from a particular item category), a pivot ID, and a pivot embedding.

While FIG. 2B provides an example in which items are sampled from the item data store 222 and associated with pivots by the generative model 228 for purposes of generating pivot embeddings, other approaches could be used to generate pivot embeddings. For instance, in some aspects, items used to generate the pivots can be assigned to the pivots as part of the pivot generation process, and the pivot embeddings can be generated based on the item embeddings for those items.

Turning again to FIG. 1, the search/recommendation system 104 further includes an item grouping component 114. Generally, the item grouping component 114 employs the pivots and pivot embeddings to group items into pivot groups based on item embeddings. The pivot groups can be provided to a user device, such as the user device 102, in order to organize the items being presented via the user device. The items to be grouped could be, for instance: recommendations being provided to a user device on an item page, homepage, or other location; or search results being returned in response to a query from a user device. As noted above, in some aspects, pivots (i.e., pivot names and pivot descriptions) and pivot embeddings can be generated offline and stored. In such configurations, the item grouping component 114 can use the stored information to group items when performing online operations of returning items to a user device. In further aspects, items can be assigned to pivots offline and information associating items to pivots can be stored. In such configurations, the stored associations between items and pivot groups can be used to generate pivot groups when items are being provided to a user device.

Figure 2C:
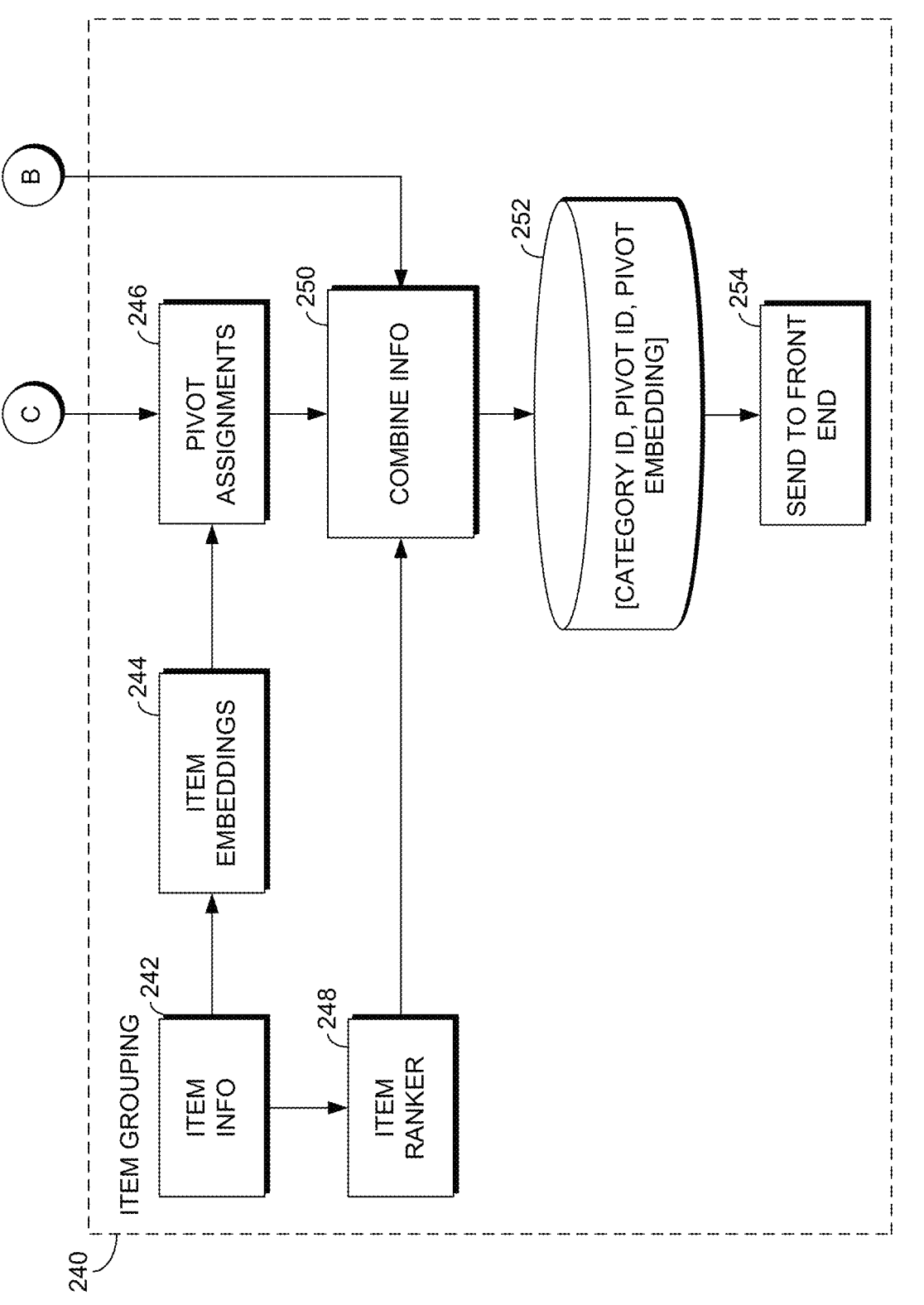
FIG. 2C is a block diagram illustrating an example process for grouping items to generate pivot groups in accordance with some implementations of the present disclosure.

FIG. 2C provides a block diagram illustrating an example process 240 for grouping items within pivots to form pivot groups, which can be performed, for instance, by the item grouping component 114 of FIG. 1. As shown in FIG. 2C, item information 242 is obtained for a number of items. The items to be grouped can correspond to items in an item data store (e.g., the item data store 118 of FIG. 1) and can be identified in any of a number of different manners within the scope of embodiments described herein. By way of example only and not limitation, the items could comprise recommended items identified using any of a variety of different recommendation algorithms. For instance, the items could be recommended items for display on an item page, a homepage (e.g., a homepage of an e-commerce website), or any other user interface area for presenting recommended items. In some cases, recommended items can be personalized recommendations for a given user based on, for instance, the user's browsing history, purchase history, and other user behavior. As another example, the items could comprise search result items identified in response to a user query.

Item embeddings 244 are obtained for each of the items identified by the item information 242. The item embeddings 244 can comprise, for instance, text-based embeddings generated from text associated with each item or multimodal embeddings, such as embeddings generated from text and images associated with each item. In some instances, item embeddings have been previously generated and stored for items. In such instances, the item information 242 can be item IDs, which are used to retrieve the stored item embeddings. In other instances, item embeddings have not been previously generated and stored. In such instances, the item information 242 can include text, images, or other content that is provided as input to a machine learning model to generate the item embeddings as part of the item grouping process 240.

Given the item embeddings 244 for the items identified by the item information 242 and pivot embeddings for various pivots (e.g., from the pivot embedding information 236 of FIG. 2B), pivot assignments 246 are generated in which each item is assigned to pivot. The pivot assignments 246 can comprise a mapping of one or more item IDs to each of a number of pivot IDs. The assignment of items to pivots can be based on a similarity measure, such as cosine similarity, between item embeddings and pivot embeddings. In some configurations, the items being grouped correspond to a given item category, and the pivots used for determining the pivot assignments 246 are based on that item category. For example, if all the items identified by the item information 242 correspond to a shoe category, pivot embeddings for pivots having a category ID for the shoe category are retrieved and used to generate the pivot assignments 246. In other words, the pivots used for grouping the items can be selected based at least in part on an item category of the items being grouped. In further configurations, the pivot assignments 246 are generated independent of item category.

As shown at block 250, the pivot assignments 246 are combined with information regarding the pivots, such as pivot names and pivot descriptions, to generate pivot groups. As such, each pivot group includes a pivot name, a pivot description, and one or more items. In some configurations, such as that shown in FIG. 2C, an item ranker 248 also provides items rankings. The item rankings could be, for instance, rankings based on relevance of items to a seed item (e.g., in the case of recommendations on an item page, the item from the item page could serve as a seed item), relevance to a user, and/or relevance to a search query. The item rankings can be used to order items within each pivot group. The item rankings can also be used to order the pivot groups with respect to one another. For instance, a pivot group ranking could be generated for each pivot group as a function of the item rankings of each item within each pivot group (e.g., an average of item rankings), and the pivot groups could be ordered based on the pivot group rankings.

Pivot group information 252 is generated from the combination of information. The pivot group information 252 for each pivot group can include, for instance, a pivot name, a pivot description, and an ordered sequence of item IDs. In some aspects, a subset of pivot groups and/or items to provide to the user device can be selected based on the pivot group rankings and item rankings. For instance, if only N pivot groups will be returned to a user device and there are initially more than N pivot groups, the N pivot groups having the highest pivot group rankings can be selected. Similarly, if only M items will be returned for each pivot group and there are initially more than M items in a pivot group, the M items having the highest item rankings can be selected. As shown at block 254, the pivot group information is provided to a front end of the system for transmitting the pivot group information to a user device for presenting the pivot groups on a user interface.

With reference again to FIG. 1, the search/recommendation system 104 further includes a user interface component 116 that provides one or more user interfaces for interacting with the search/recommendation system 104. The user interface component 116 provides one or more user interfaces to a user device, such as the user device 102. In some instances, the user interfaces can be presented on the user device 102 via the application 108, which can be a web browser or a dedicated application for interacting with the content generation system 104. For instance, the user interface component 116 can provide user interfaces for, among other things, interacting with the search/recommendation system 104 to submit search queries or other input to the search/recommendation system 104. The user interface component 116 can also provide user interfaces for presenting pivot groups and allowing a user associated with a user device to interact with the pivot groups.

Figure 5:
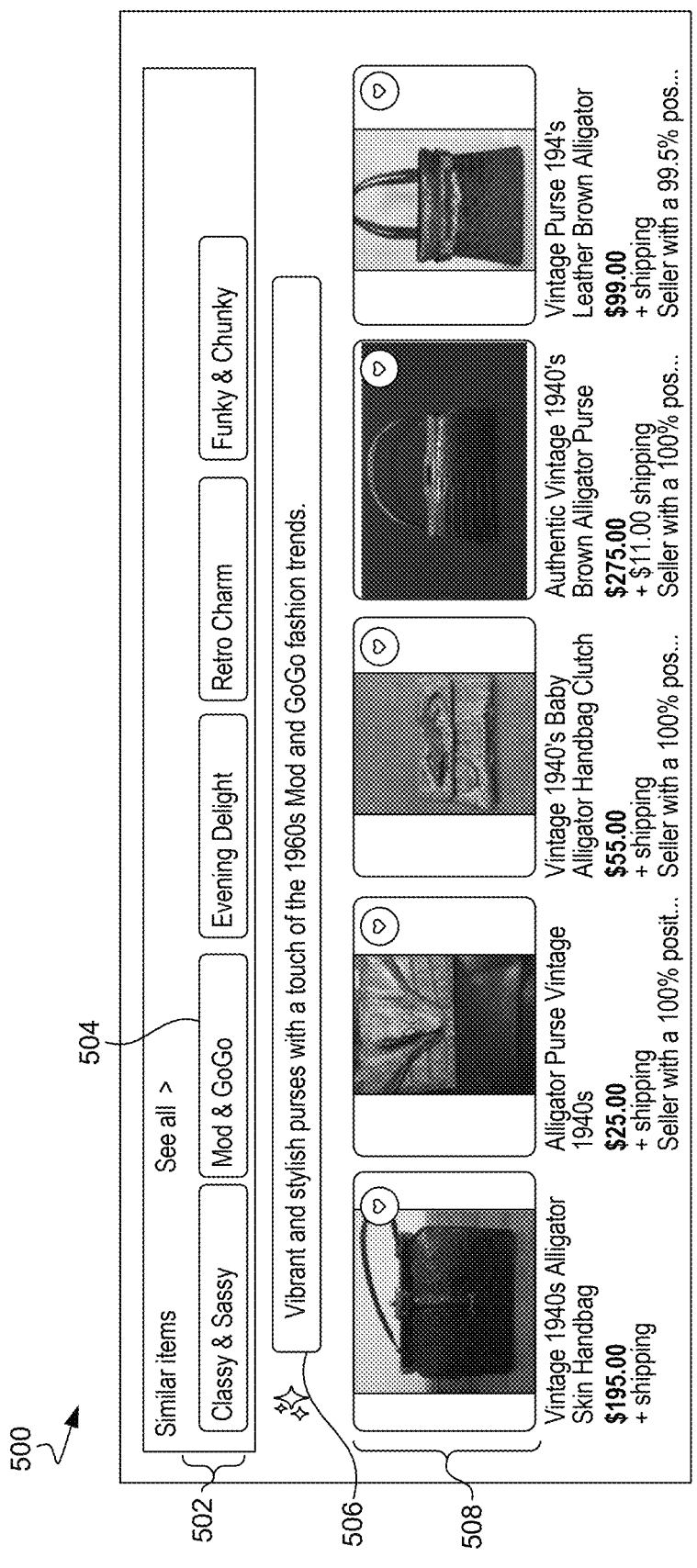
FIG. 5 is a diagram providing an example user interface with pivot groups in accordance with some implementations of the present disclosure.
Figure 6:
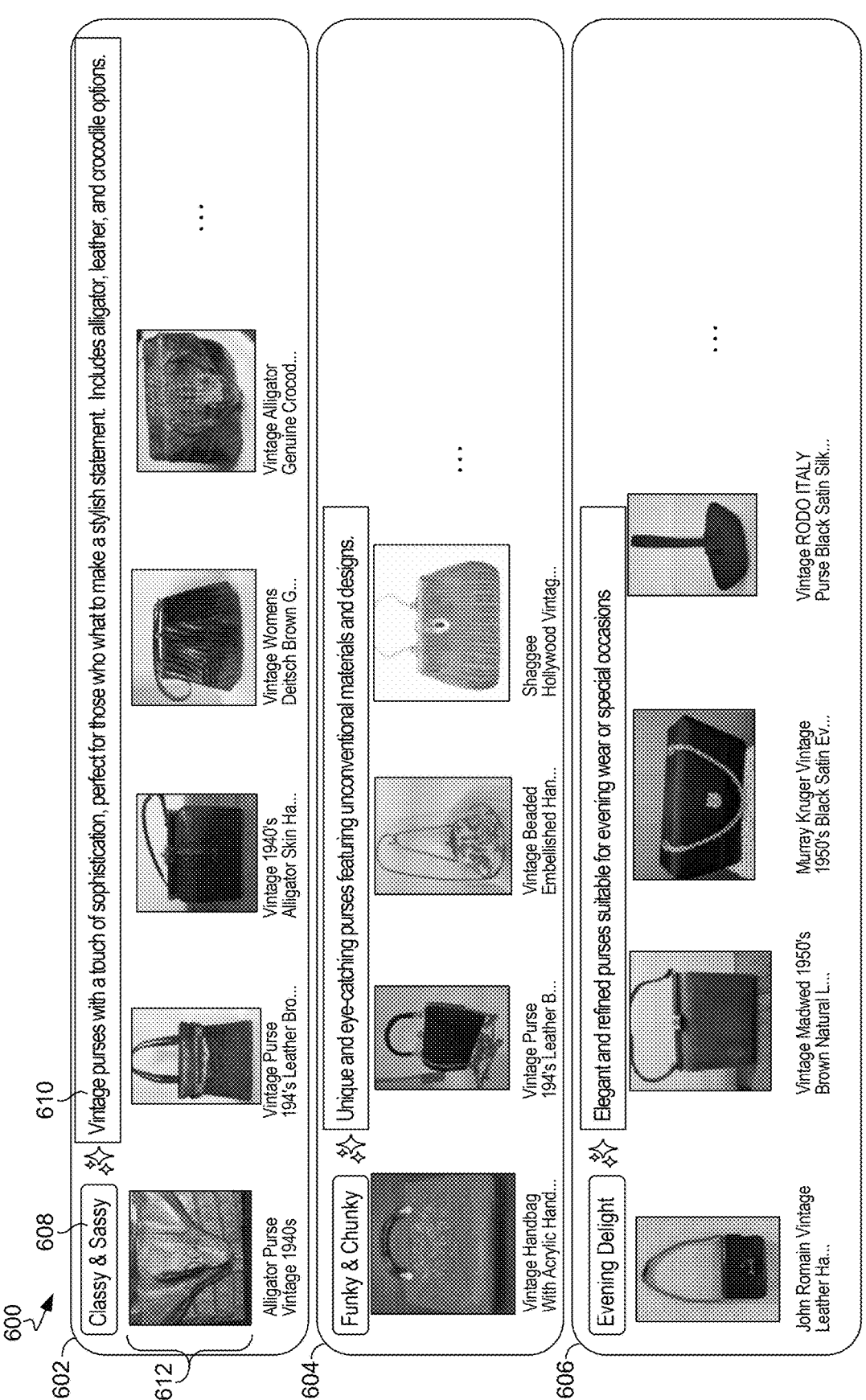
FIG. 6 is a diagram providing another example user interface with pivot groups in accordance with some implementations of the present disclosure.

FIGS. 5 and 6 provide examples of user interfaces presenting pivot groups generated in accordance with some aspects of the present technology. With initial reference to FIG. 5, a user interface 500 is provided that presents a recommendation section labeled "Similar items" that could be provided, for instance, on an item page for a particular item listing in order to present items that are similar to the item for the item page. The user interface 500 includes a pivot label area 502 that presents user-selectable user interface elements (e.g., "buttons") with the pivot names for available pivot groups. Each button in the pivot label area 502 comprises a user-selectable user interface element that, when selected, presents the pivot description for the associated pivot group and items within the pivot group. For instance, the button 504 for the pivot group with the pivot name "Mod & GoGo" has been selected. As such, a pivot description 506 for the "Mod & GoGo" pivot group is presented with a number of items 508 within the selected pivot group. A user can browse items in the various pivot groups by selecting different buttons in the pivot label area 502 and can visit an item page for an item by selecting a presented item.

FIG. 6 presents another user interface 600 for presenting pivot groups. In the example of FIG. 6, the user interface 600 presents each of the pivot groups, including pivot group 602, pivot group 604, and pivot group 606. Each pivot group includes a pivot name, pivot description, and items within the pivot group. For instance, the pivot group 602 includes the pivot name 608, the pivot description 610, and the items presented in the items area 612. A user can browse the items in the various pivot groups and visit an item page for an item by selecting a presented item.

Example Methods for Generating Pivot Groups

Figure 7:
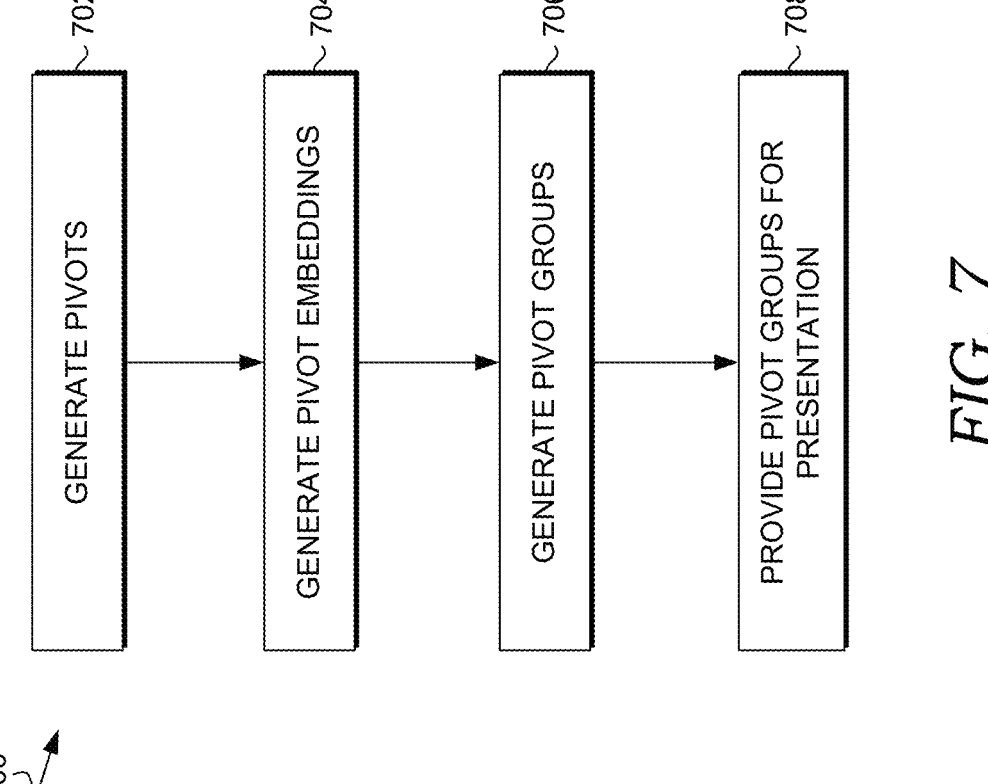
FIG. 7 is a flow diagram showing a method for generating and providing pivot groups in accordance with some implementations of the present disclosure.

With reference now to FIG. 7, a flow diagram is provided that illustrates an overall method 700 for generating and providing pivot groups. The method 700 may be performed, for instance, by the search/recommendation system 104 of FIG. 1. Each block of the method 700 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 702, pivots are generated using a generative model. The pivots include pivot names and pivot descriptions that comprise text generated by the generative model. The pivots can be generated, for instance, via the method 800 described below with reference to FIG. 8. Pivot embeddings are generated for each of the pivots, as shown at block 704. The pivot embeddings can be generated, for instance, via the method 900 described below with reference to FIG. 9. Pivot groups are generated for a number of items using the pivot embeddings and item embeddings for the items, as shown at block 706. The pivot groups can be generated, for instance, via the method 1000 described below with reference to FIG. 10. The pivot groups are provided to a user device for presentation, as shown at block 708.

Figure 8:
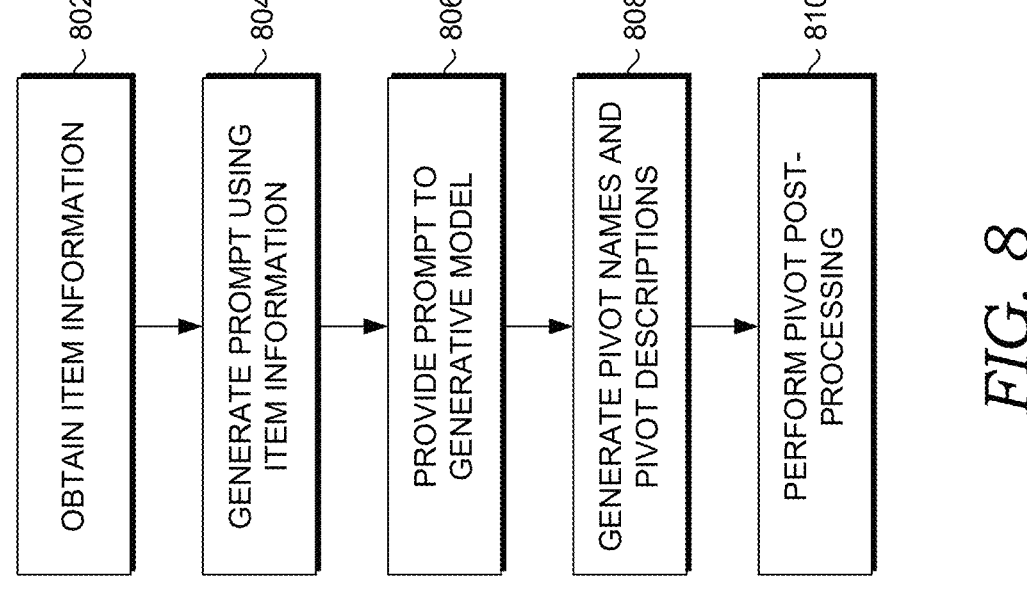
FIG. 8 is a flow diagram showing a method for generating pivots using a generative model in accordance with some implementations of the present disclosure.

FIG. 8 presents a flow diagram showing a method 800 for generating pivots. The method 800 can be performed, for instance, by the pivot generation component 110 of FIG. 1. As shown at block 802, item information is obtained for a number of items. The item information can be retrieved, for instance, from an item data store that stores information for items available from a listing platform. In some configurations, the item information is retrieved for items from a particular item category.

As shown at block 804, a prompt is generated using the item information. The prompt can include information to instruct a generative model to generate pivots, including pivot names and pivot descriptions, based on the item information. In some configurations, the prompt includes one or more rules that instruct the generative model regarding how the pivot names and pivot descriptions should be generated.

The prompt is provided as input to a generative model, as shown at block 806. Based on the prompt, the generative model generates a number of pivots, as shown at block 808. In particular, the generative model generates text for a pivot name and a pivot description for each pivot. Pivot post-processing is performed at block 810. The pivot post-processing could include, for instance, deduping similar pivots, confirming the usefulness of the generated pivots, and/or causing the generative model to refine the pivots.

Figure 9:
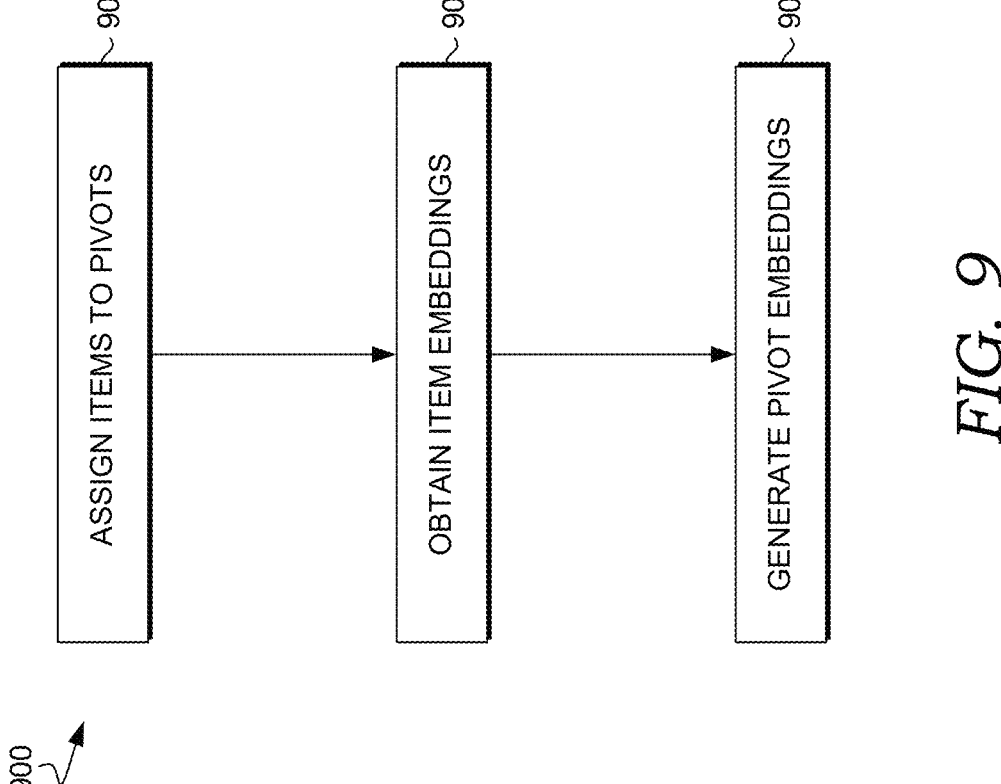
FIG. 9 is a flow diagram showing a method for generating pivot embeddings in accordance with some implementations of the present disclosure.

FIG. 9 provides a flow diagram showing a method 900 for generating pivot embeddings. The method 900 can be performed, for instance, by the pivot embedding component 112 of FIG. 1. As shown at block 902, items are assigned to pivots. The assignment of items to pivots could be performed, for instance, by prompting a generative model to perform the assignments. The items could comprise the items used by the generative model to generate the pivots (e.g., by the method 800) and/or other items sampled from an item data store for the purpose of generative pivot embeddings.

As shown at block 904, item embeddings for the items are obtained. In some instances, the item embeddings have been previously generated and stored. In such instances, the item embeddings are retrieved from storage. In other instances, the item embeddings are generated as part of the method 900. The item embeddings can comprise, for instance, text-based embeddings generated from textual descriptions of the items or multi-modal embeddings (e.g., generated from text and images for the items).

Pivot embeddings are generated as a function of the item embeddings, as shown at block 906. For a given pivot, the pivot embedding is generated as a function of the item embeddings of items assigned to the pivot at block 902. For instance, the pivot embedding for a pivot could comprise an average of the item embeddings for items assigned to the pivot.

Figure 10:
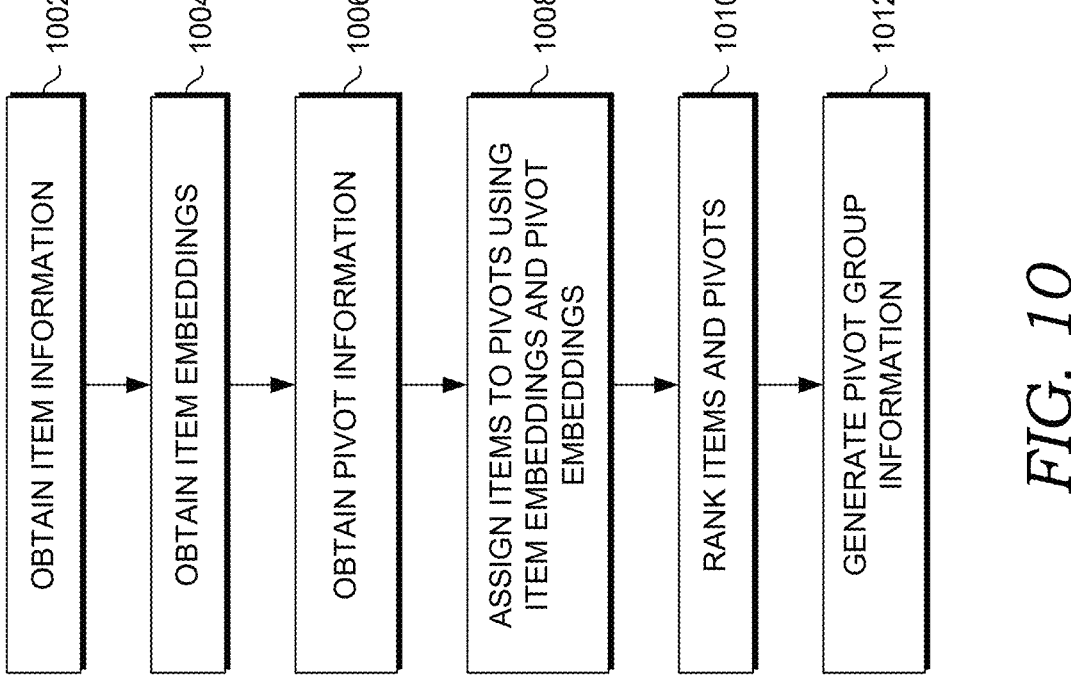
FIG. 10 is a flow diagram showing a method for grouping items to generate pivot groups in accordance with some implementations of the present disclosure.

FIG. 10 provides a flow diagram showing a method 1000 for generating pivot groups. The method 1000 can be performed, for instance, by the item grouping component 114 of FIG. 1. As shown at block 1002, item information for items to be returned to a user device is obtained. The items could be, for instance, recommended items or search result items. Item embeddings for the items are obtained, as shown at block 1004. In some instances, the item embeddings have been previously generated and stored. In such instances, the item embeddings are retrieved from storage. In other instances, the item embeddings are generated as part of the method 1000. The item embeddings can comprise, for instance, text-based embeddings generated from textual descriptions of the items or multi-modal embeddings (e.g., generated from text and images for the items).

As shown at block 1006, pivot information is obtained for generating pivot groups for the items. The pivot information can comprise pivot embeddings for a number of pivots. In some configurations, the pivot information is for pivots corresponding to a particular item category corresponding with the items being grouped. For instance, if the items correspond to a shoe category, pivot information for pivots corresponding to the shoe category could be obtained.

Items are assigned to pivots using the pivot embeddings and the item embeddings, as shown at block 1008. For instance, a similarity measure, such as cosine similarity, could be used to compare item embeddings and pivot embeddings. A given item can be assigned to a given pivot based on the item embedding having a greater similar measure with the pivot embedding for the pivot than the similarity measure of the item embedding for other pivot embeddings.

Item and pivot ranking is performed, as shown at block 1010. Item rankings could be provided for the items based on, for instance, the relevance of the items as recommend items or search results. The items can be ordered within each pivot group based on the item rankings. Pivot group rankings can be determined for the pivot groups based on the item rankings for items assigned to each pivot group. For instance, the pivot group ranking of a pivot group can be a function (e.g., average) of the item rankings of items assigned to the pivot group. The pivot groups can be ordered with respect to one another based on their respective pivot rankings.

Pivot group information is generated, as shown at block 1012. The pivot group information for each pivot group can include, for instance, a pivot name, a pivot description, and an ordered sequence of items. The pivot group information can further set forth an order of the pivot groups based on the pivot rankings. The pivot group information can be provided to a user device for presenting the pivot groups on a user interface.

Exemplary Operating Environment

Figure 11:
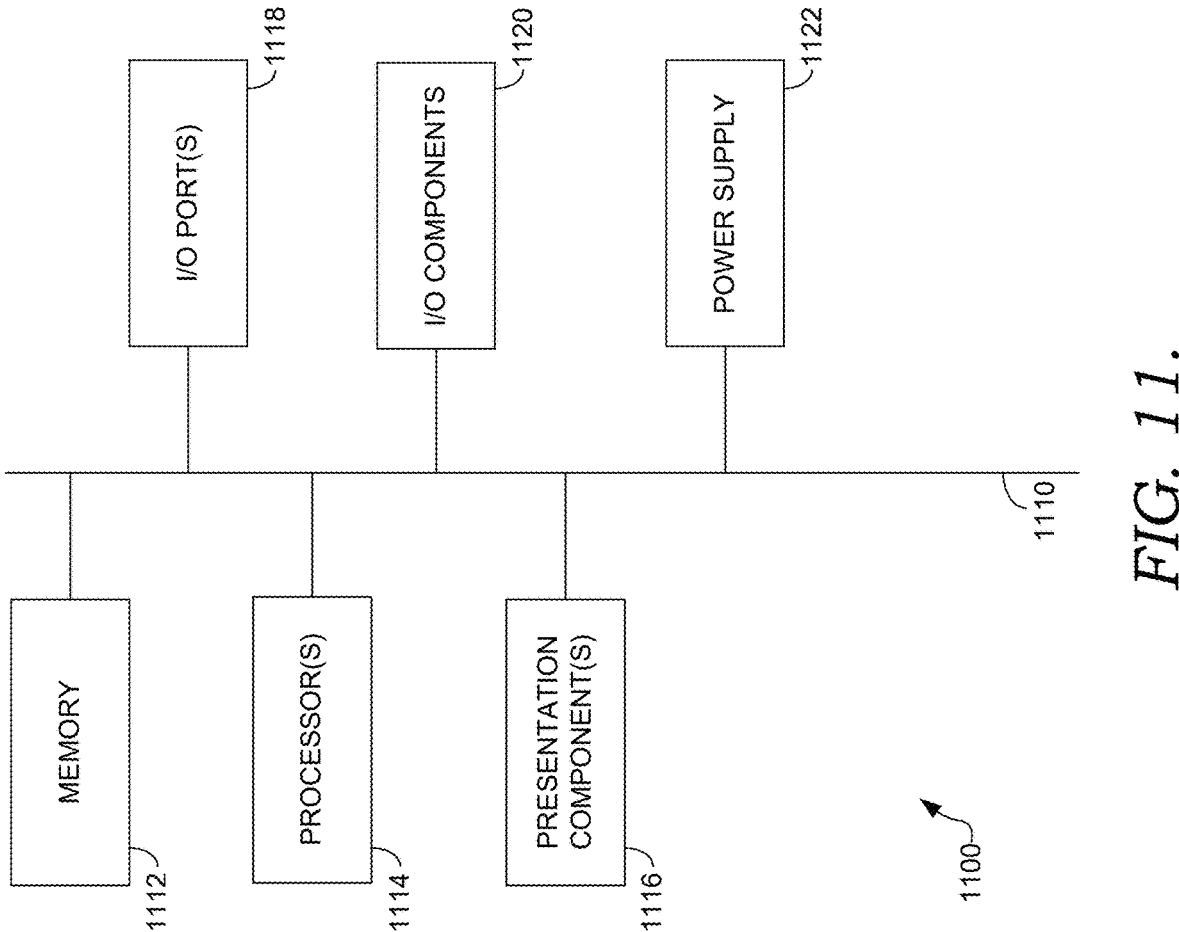
FIG. 11 is a block diagram of an exemplary computing environment suitable for use in implementations of the present disclosure.

Having described implementations of the present disclosure, an exemplary operating environment in which embodiments of the present technology may be implemented is described below in order to provide a general context for various aspects of the present disclosure. Referring initially to FIG. 11 in particular, an exemplary operating environment for implementing embodiments of the present technology is shown and designated generally as computing device 1100. Computing device 1100 is but one example of a suitable computing environment and is not intended to suggest any limitation as to the scope of use or functionality of the technology. Neither should the computing device 1100 be interpreted as having any dependency or requirement relating to any one or combination of components illustrated.

The technology may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network.

With reference to FIG. 11, computing device 1100 includes bus 1110 that directly or indirectly couples the following devices: memory 1112, one or more processors 1114, one or more presentation components 1116, input/output (I/O) ports 1118, input/output components 1120, and illustrative power supply 1122. Bus 1110 represents what may be one or more busses (such as an address bus, data bus, or combination thereof). Although the various blocks of FIG. 11 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 11 is merely illustrative of an exemplary computing device that can be used in connection with one or more embodiments of the present technology. Distinction is not made between such categories as "workstation," "server," "laptop," "hand-held device," etc., as all are contemplated within the scope of FIG. 11 and reference to "computing device."

Computing device 1100 typically includes a variety of computer-readable media. Computer-readable media can be any available media that can be accessed by computing device 1100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1100. The terms "computer storage media" and "computer storage medium" do not comprise signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1112 includes computer storage media in the form of volatile and/or nonvolatile memory. The memory may be removable, non-removable, or a combination thereof. Exemplary hardware devices include solid-state memory, hard drives, optical-disc drives, etc. Computing device 1100 includes one or more processors that read data from various entities such as memory 1112 or I/O components 1120. Presentation component(s) 1116 present data indications to a user or other device. Exemplary presentation components include a display device, speaker, printing component, vibrating component, etc.

I/O ports 1118 allow computing device 1100 to be logically coupled to other devices including I/O components 1120, some of which may be built in. Illustrative components include a microphone, joystick, game pad, satellite dish, scanner, printer, wireless device, etc. The I/O components 1120 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 1100. The computing device 1100 may be equipped with depth cameras, such as, stereoscopic camera systems, infrared camera systems, RGB camera systems, and combinations of these for gesture detection and recognition. Additionally, the computing device 1100 may be equipped with accelerometers or gyroscopes that enable detection of motion.

The present technology has been described in relation to particular embodiments, which are intended in all respects to be illustrative rather than restrictive. Alternative embodiments will become apparent to those of ordinary skill in the art to which the present technology pertains without departing from its scope.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described herein may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment; however, the distributed computing environment depicted herein is merely exemplary. Components can be configured for performing novel embodiments of embodiments, where the term "configured for" can refer to "programmed to" perform particular tasks or implement particular abstract data types using code. Further, while embodiments of the present technology may generally refer to the technical solution environment and the schematics described herein, it is understood that the techniques described may be extended to other implementation contexts.

From the foregoing, it will be seen that this technology is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more servers of a search system, cause the search system to perform operations, the operations comprising:

accessing, by at least one of the one or more servers of the search system, item information for a first plurality of items from an item data store of the search system;

causing a generative model to generate a plurality of pivots using the item information by discovering a plurality of themes from the item information, each pivot from the plurality of pivots corresponding to a theme from the plurality of themes and including a pivot name and a pivot description;

generating, by an embedding model, a pivot embedding for each pivot;

obtaining, by at least one of the one or more servers of the search system, an item embedding generated by the embedding model for each item from a second plurality of items identified from the item data store as search result items or recommended items in response to a search input or a recommendation input;

assigning, by at least one of the one or more servers of the search system, items from the second plurality of items to pivots from the plurality of pivots based on the item embeddings and the pivot embeddings to generate a plurality of pivot groups that organize the second plurality of items around the plurality of themes, wherein each pivot group comprises a subset of items from the second plurality of items; and providing, by at least one of the one or more servers of the search system, user interface information to present one or more pivot groups of the plurality of pivot groups on a user device, wherein the one or more pivot groups comprises a first pivot group having a first pivot title, a first pivot description, and a first subset of items from the second plurality of items, wherein the user interface information for the first pivot groups presents at least a portion of the first subset of items in association with at least one of the first pivot name or the first pivot description.

2. The one or more computer storage media of claim 1, wherein accessing item information for the first plurality of items comprises:

selecting a first item category from a plurality of item categories; and selecting the first plurality of items based on the first item category.

3. The one or more computer storage media of claim 1, wherein causing the generative model to generate the plurality of pivots comprises:

generating a prompt that includes the item information for the first plurality of items and one or more rules to instruct the generative model regarding the generation of the pivot names and the pivot descriptions for the pivots; and providing the prompt as an input to the generative model.

4. The one or more computer storage media of claim 1, wherein generating the pivot embedding for each pivot comprises generating a first pivot embedding for a first pivot from the plurality of pivots by:

associating a third plurality of items with the first pivot;

obtaining an item embedding for each item from the third plurality of items; and generating the first pivot embedding using the item embedding for each item from the third plurality of items.

5. The one or more computer storage media of claim 4, wherein the third plurality of items comprises a subset of one or more items from the first plurality of items, and wherein the generative model associates the third plurality of items with the first pivot.

6. The one or more computer storage media of claim 1, wherein the plurality of pivots are associated with an item category, and wherein assigning items from the second plurality of items to pivots from the plurality of pivots comprises:

determining the second plurality of items are associated with the item category; and selecting the plurality of pivots based on the second plurality of items being associated with the item category.

7. The one or more computer storage media of claim 1, wherein the operations further comprise:

determining an item ranking for each item from the second plurality of items; and determining a pivot ranking for each pivot group from the plurality of pivot groups.

8. The one or more computer storage media of claim 7, wherein the pivot ranking for a first pivot group from the plurality of pivot groups is determined based on the item ranking for each item from a first subset of items assigned to the first pivot group.

9. The one or more computer storage media of claim 7, wherein the user interface information organizes the pivot groups based on the pivot rankings.

\* \* \* \* \*